United States Patent
Wang et al.

(10) Patent No.: US 8,599,704 B2
(45) Date of Patent: Dec. 3, 2013

(54) ASSESSING GATEWAY QUALITY USING AUDIO SYSTEMS

(75) Inventors: Kuansan Wang, Bellevue, WA (US); Nirav Girish Shah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1779 days.

(21) Appl. No.: 11/656,606

(22) Filed: Jan. 23, 2007

(65) Prior Publication Data

US 2008/0177534 A1 Jul. 24, 2008

(51) Int. Cl.
*H04M 1/64* (2006.01)
*H04M 3/22* (2006.01)
*G01R 31/08* (2006.01)
*H04L 12/66* (2006.01)

(52) U.S. Cl.
USPC ........... 370/251; 370/353; 370/354; 370/356; 379/88.09; 379/88.17; 379/27.01; 379/88.22

(58) Field of Classification Search
USPC .......... 709/224; 370/352, 251, 353, 354, 356; 379/88.1, 88.22, 88.09, 406.01, 88.17, 379/27.01
See application file for complete search history.

(56) References Cited

U.S. PATENT DOCUMENTS

| | | | |
|---|---|---|---|
| 5,566,272 A | 10/1996 | Brems et al. | |
| 5,640,490 A | 6/1997 | Hansen et al. | |
| 6,202,047 B1 | 3/2001 | Ephraim et al. | |
| 6,249,570 B1 * | 6/2001 | Glowny et al. | 379/88.22 |
| 6,324,170 B1 | 11/2001 | McClennon et al. | |
| 6,785,267 B1 * | 8/2004 | Knappe | 370/353 |
| 6,996,068 B1 * | 2/2006 | Sherlock | 370/248 |
| 7,003,458 B2 | 2/2006 | Feng et al. | |
| 7,026,957 B2 | 4/2006 | Rubenstein | |
| 7,058,713 B2 * | 6/2006 | Reynolds et al. | 709/224 |
| 7,085,374 B2 | 8/2006 | Schulz | |
| 7,130,281 B1 | 10/2006 | Surazski et al. | |
| 7,218,895 B1 * | 5/2007 | Raghavan | 455/67.13 |
| 7,286,652 B1 * | 10/2007 | Azriel et al. | 379/88.22 |
| 7,391,765 B2 * | 6/2008 | Tezuka et al. | 370/356 |
| 7,408,884 B2 * | 8/2008 | Bauer et al. | 370/252 |

(Continued)

FOREIGN PATENT DOCUMENTS

WO WO2005099231 A1 10/2005

OTHER PUBLICATIONS

"Acoustic Echo Cancellation in IP Phones", http://www.globalipsound.com/pdf/AEC_TestReport.pdf.

(Continued)

*Primary Examiner* — Lisa Hashem
(74) *Attorney, Agent, or Firm* — Gonzalez Saggio & Harlan LLP

(57) ABSTRACT

Described is automatically testing the quality of an audio channel between a caller and a callee that includes a device under test, such as a VoIP or other gateway. An analyzer receives timestamps from a caller and callee during a calling session, including timestamps for when the callee initially provides audio (e.g., speech) to the caller, when the caller initially detects sound, when the caller initially provides audio to the callee, and when the callee initially detects sound. The analyzer uses the relative timing of the timestamps and the speech recognizer's outcome to determine whether the audio channel is experiencing interference or echo. When the audio includes speech, a confidence level corresponding to accuracy of speech recognition also may establish the audio channel's quality. Random selection and timing of output may be employed, such as to vary the testing patterns during repetitive tests.

19 Claims, 8 Drawing Sheets

(56) References Cited

U.S. PATENT DOCUMENTS

| | | | |
|---|---|---|---|
| 7,426,221 B1* | 9/2008 | Cutaia | 370/516 |
| 7,525,952 B1* | 4/2009 | Shankar et al. | 370/352 |
| 7,664,231 B2* | 2/2010 | Schmidmer et al. | 379/1.02 |
| 7,813,378 B2* | 10/2010 | Gass | 370/474 |
| 8,194,565 B2* | 6/2012 | Goodman | 370/253 |
| 2002/0035616 A1* | 3/2002 | Diamond et al. | 709/219 |
| 2002/0075818 A1 | 6/2002 | Matsuo | |
| 2002/0131604 A1* | 9/2002 | Amine | 381/58 |
| 2003/0179745 A1* | 9/2003 | Tsutsumi et al. | 370/352 |
| 2004/0162722 A1* | 8/2004 | Rex et al. | 704/211 |
| 2004/0215448 A1* | 10/2004 | Funatsu et al. | 704/201 |
| 2005/0015253 A1 | 1/2005 | Rambo et al. | |
| 2005/0261895 A1* | 11/2005 | Bauer et al. | 704/216 |
| 2006/0031469 A1 | 2/2006 | Clarke et al. | |
| 2006/0104218 A1 | 5/2006 | Kako | |
| 2006/0153174 A1* | 7/2006 | Towns-von Stauber et al. | 370/356 |
| 2006/0193273 A1* | 8/2006 | Passier et al. | 370/310 |
| 2007/0239458 A1* | 10/2007 | Odell et al. | 704/275 |
| 2008/0014883 A1* | 1/2008 | Topaltzas et al. | 455/187.1 |
| 2008/0177534 A1 | 7/2008 | Wang et al. | |
| 2008/0215717 A1* | 9/2008 | Zhou et al. | 709/223 |
| 2008/0255829 A1* | 10/2008 | Cheng | 704/201 |
| 2009/0061843 A1* | 3/2009 | Topaltzas | 455/423 |
| 2009/0096874 A1* | 4/2009 | Hayashi et al. | 348/192 |
| 2009/0111459 A1* | 4/2009 | Topaltzas et al. | 455/423 |
| 2009/0129282 A1* | 5/2009 | Lee et al. | 370/252 |
| 2009/0132248 A1* | 5/2009 | Nongpiur | 704/233 |
| 2009/0316881 A1* | 12/2009 | Prakash et al. | 379/406.01 |
| 2010/0189290 A1* | 7/2010 | Choi | 381/309 |
| 2011/0130136 A1* | 6/2011 | Topaltzas et al. | 455/423 |
| 2011/0246192 A1* | 10/2011 | Homma | 704/228 |
| 2011/0292797 A1* | 12/2011 | Bejerano | 370/230.1 |
| 2012/0099734 A1* | 4/2012 | Joly | 381/56 |
| 2012/0113270 A1* | 5/2012 | Spracklen | 348/194 |
| 2012/0170761 A1* | 7/2012 | Ozawa | 381/56 |
| 2013/0170391 A1* | 7/2013 | Feiten et al. | 370/252 |

OTHER PUBLICATIONS

"Voice Enhancement for VoIP-Pstn Gateways", http://www.ditechcom.com/solutions/solutionsdetail.aspx?pid=47.

Mandelstam, David, "Echo and Soft VoIP Pbx Systems", hftp://delivery.acm.org/10.1145/1110000/1103055/8424.html?key1=1103055&key2=3230187611&col1=Acm&dl=Acm&Cfid=75919783&Cftoken=92791909.

\* cited by examiner

ASSESSING GATEWAY QUALITY USING AUDIO SYSTEMS

BACKGROUND

Some contemporary communication systems use the Internet for transmitting voice calls; the underlying technology is generally referred to as voice over internet protocol, or VoIP. Gateways are devices often used in VoIP systems to bridge the traffic across domains. For example, a business using an internet protocol-based private branch exchange (IP-PBX) system usually has one or more VoIP gateways to connect the PBX to the public internet, and also may have some 'PSTN gateways' for connecting to the traditional public switched telephone network. The gateways are responsible for relaying control signals as well as for relaying the media for each communication link.

Currently, gateways are tested for their quality with respect to relaying audio streams by having a human tester listen in on VoIP calls. In general, any echo and interference (distortion) are noted by the tester. However, such a testing process is somewhat subjective, is not scalable to testing large numbers of devices, and can be quite expensive.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which quality of an audio channel between a caller and a callee is evaluated, including by outputting audio generated from audio files at the callee and caller, and detected at the callee and caller, respectively. The relative timing of outputting the audio and detecting sounds at the caller and callee is analyzed to provide results indicative of the quality of the audio channel. The audio channel may include an IP-PBX device, and/or a gateway, such as a VoIP gateway or a PSTN gateway.

In one example implementation, the audio channel between a caller mechanism and a callee mechanism includes a device under test. An analyzer receives timestamps from the caller mechanism and the callee mechanism during a calling session, including a first timestamp corresponding to when the callee mechanism initially provides audio to the caller mechanism, a second timestamp corresponding to when the caller mechanism initially detects sound, a third timestamp corresponding to when the caller mechanism initially provides audio to the callee mechanism, and a fourth timestamp corresponding to when the callee mechanism initially detects sound. The analyzer determines that the audio channel is operating correctly with respect to not having interference or echo when the first timestamp is before the second timestamp, the second timestamp is before the third timestamp, and the third timestamp is before the fourth timestamp. Alternatively the analyzer determines that the audio channel has interference when the fourth timestamp is before the first timestamp or the second timestamp is before the first timestamp, or the audio channel has echo when the fourth timestamp is before the third timestamp and after the first timestamp. When the audio includes speech, a speech recognizer recognizes the speech and a confidence level corresponding to accuracy of speech recognition may also be used to establish the quality of the audio channel. Speech recognition may also be used to detect echo, e.g., when the output speech is recognized as matching input speech. One or more audio files may be randomly selected, and/or the time or times corresponding to generating audio from one or more of the audio files may be random, such as to vary the testing.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using an audio file (e.g., a ".wav" file) or set of audio files to evaluate the quality of VoIP or PSTN gateways, and/or an IP-PBX device. In general, the audio files correspond to set of spoken words that can be recognized by speech recognition systems. As described below, the caller and the callee mechanisms ordinarily use different audio files, each comprising distinct audio such as speech, to facilitate delayed echo detection based part on expected differences in the files, e.g., via speech recognition. However, certain echo detection can also be performed via files that do not necessarily include speech, in which event it is possible to use alternative audio files that comprise tones for testing, possibly including subsonic and/or supersonic frequencies, which may be the same files at the caller and callee.

In one example implementation, there is described a gateway and/or IP-PBX testing configuration in which a call is placed from a calling mechanism on a testing computing device back to a callee mechanism on the same computing device. As can be readily appreciated, any number of intermediary devices and/or networks may be present between the caller and the callee, including a PBX device, the PSTN, one or more gateways, an intranet, the public Internet, and so forth. However, these intermediaries introduce external variables, and ordinarily are thus avoided to the extent possible, except possibly when it is desired to evaluate a device's operation with one or more specific intermediaries being present, for example. Further, while the caller mechanism can be on the same computing device as the calling mechanism, separate computer systems for each may also be used, as long as the clocks on the separate computing systems are synchronized.

Thus, as will be understood, the technology described herein is not limited to any type of test configuration, nor to any particular type of gateway and/or particular type (e.g., PBX-type) of telephone systems, but applies to any configuration and/or telephone related-devices that are present in an audio channel. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, telephony and/or testing in general.

Figure 1:
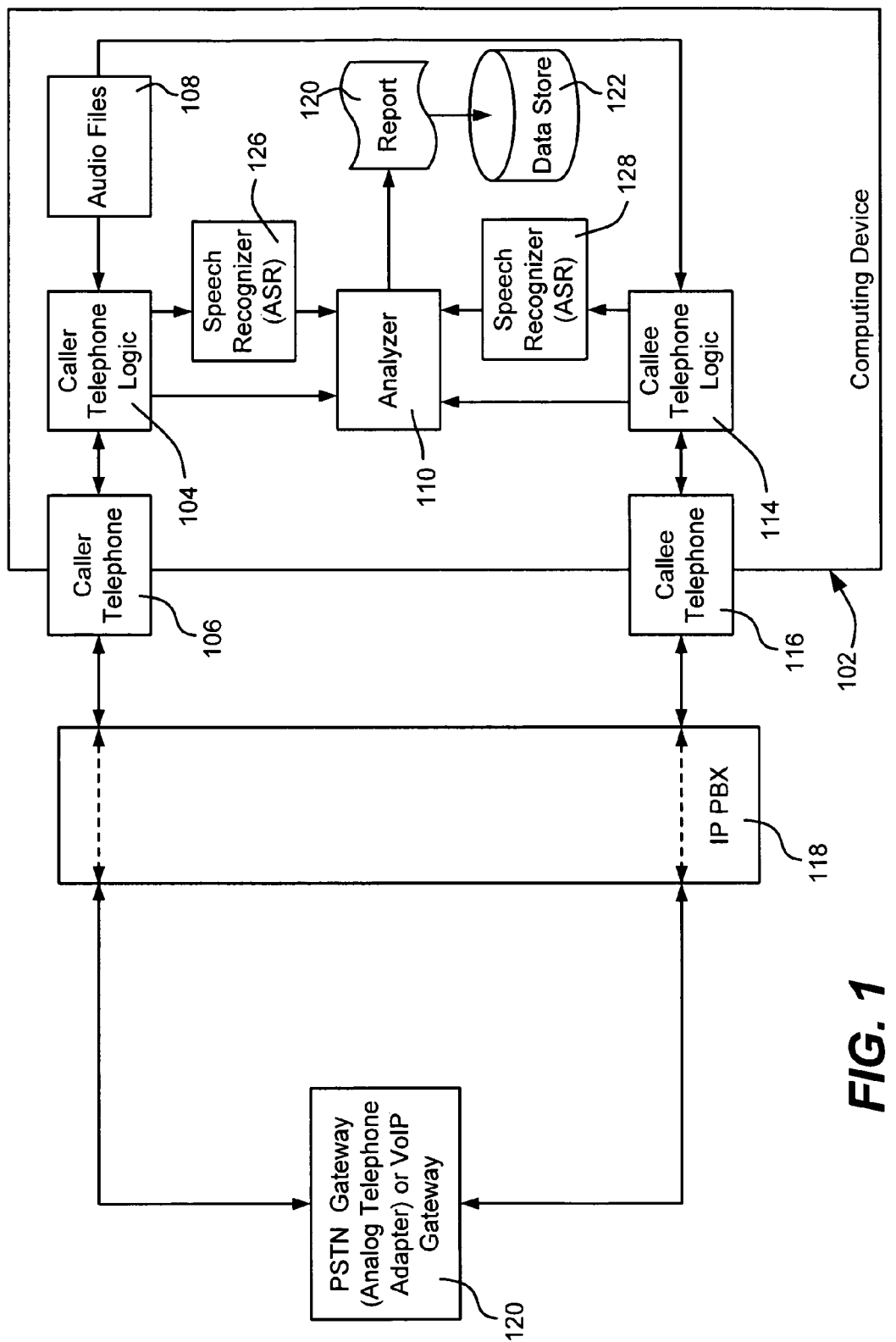
FIG. 1 shows an illustrative example of an automated testing configuration for testing gateways for quality in relaying audio streams.
Figure 2:
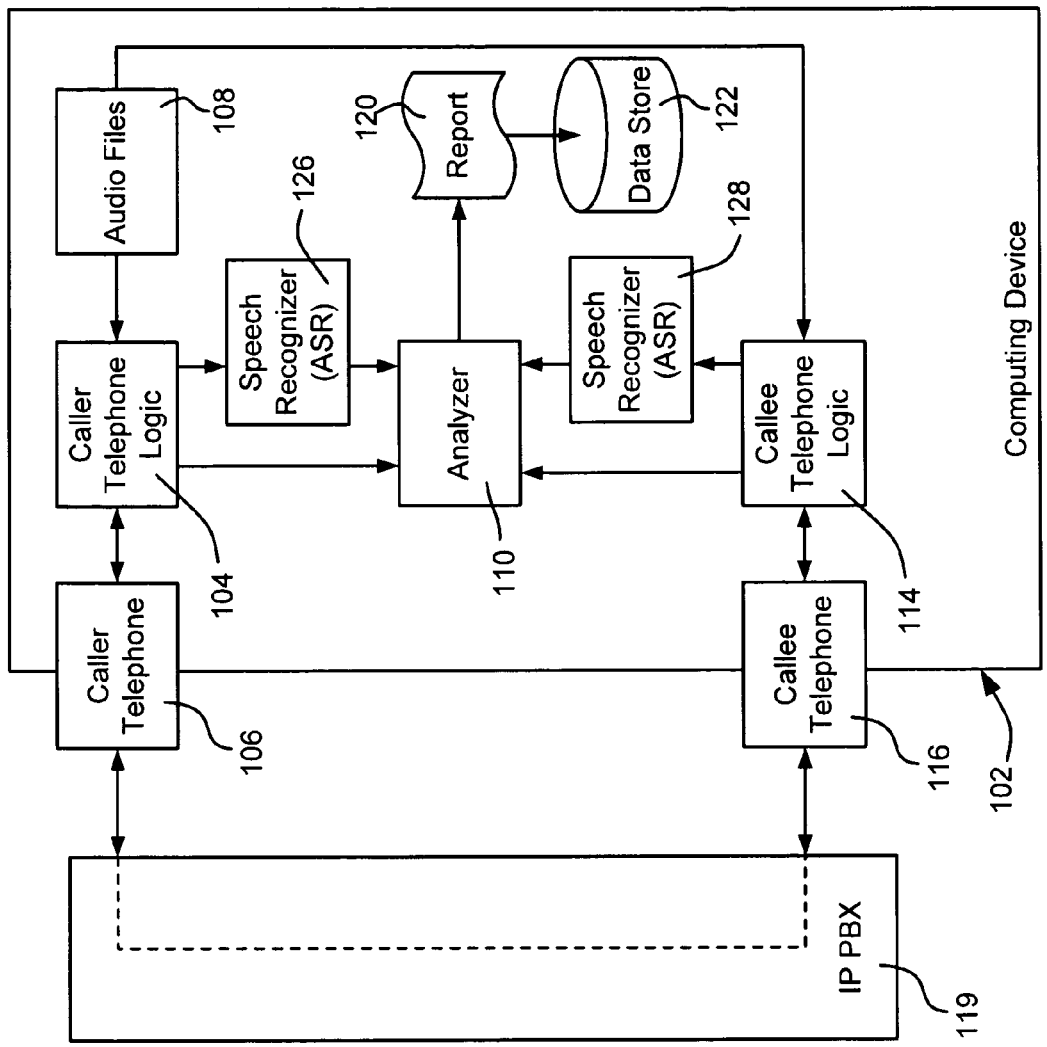
FIG. 2 shows an illustrative example of an automated testing configuration for testing an IP-PBX for quality in relaying audio streams.

Turning to FIGS. 1 and 2, there is shown a computing device 102 having a caller mechanism comprising caller telephone logic 104 and a caller telephone 106. The caller telephone 106 may be an internal component or an external component, but in any event, is controlled by the caller phone logic 106 to output appropriate audio signals such as generated from a selected audio file of a set of audio files 108. As described below, the caller telephone logic 106 is also configured to output other data, including timestamp data to an analyzer 110, as described below.

The exemplified computing device 102 also includes a callee mechanism comprising callee telephone logic 114 and a callee telephone 116. The callee telephone 116 likewise may be an internal component or an external component, but in any event, is controlled by the callee telephone logic 114 to output appropriate audio signals such as generated from a selected audio file of the set of audio files 108. The callee telephone logic 114 also outputs other data including timestamps to the analyzer 110, as also described below.

The caller telephone may be coupled to the callee telephone in essentially any way, with any number of intermediary devices, including a device or combination of devices under test. In FIG. 1, an IP-PBX device 118 (e.g., an actual such device or an emulator of one) couples the caller telephone 106 to the callee telephone 116 via a gateway 120 that is being evaluated, such as a PSTN gateway (also referred to as an analog telephone adapter) or VoIP gateway. Note that in this example, the gateway 120 is configured to call back to the IP-PBX device 118 without going through another intermediary device and/or network, thereby avoiding any testing results that are influenced by external variables. Further note that the IP-PBX device 118 may be one that has been thoroughly tested (e.g., on its own as described below with respect to FIG. 2 and/or with other gateway devices) to know it is not a cause of any reduced quality, thereby ensuring that any quality problems that are detected originate at the gateway being tested.

FIG. 2 shows an alternative test configuration in which the internal switching quality of an IP-PBX device 119 is tested. This test generally applies to an actual IP-PBX device 119 that would, in typical use, switch a caller on the private network to a callee also on the private network without the need for any gateway.

To evaluate the quality of a gateway (FIG. 1) 120 or PBX device 119 (FIG. 2), various data is analyzed by the analyzer 110, including timestamps and speech data. In general, the analyzer generates a test report 120 based on the data, which may be persisted in a data store 122.

For speech recognition purposes, the caller telephone logic 104 is associated with one automatic speech recognizer 126, while the callee telephone logic 114 is associated with another automatic speech recognizer 128, (although it is feasible to have a single speech recognizer multiplexed between the caller and callee as needed). The automatic speech recognizers 126 and 128 assume the roles of a human speaker and listener, to automate gateway and PBX device testing, and thereby lower the testing cost for VoIP deployment or the like. However, because automated speech recognition can introduce errors, additional baseline measures are also established and provided.

An aspect of the testing is to quantitatively determine the audio channel quality for VoIP calls. More particularly, when VoIP calls are routed through VoIP or PSTN gateways, these intermediate devices often introduce echoes or random noise interference in the audio channel. The testing described herein detects such quality disturbances.

To this end, the caller logic 104 and callee logic 114 execute a test scenario and record timestamps for significant events. The analyzer 110 interprets these timestamps and generates a report 120 indicating the occurrence of echoes, noise interferences and the overall quality of the recognized speech.

Figure 3:
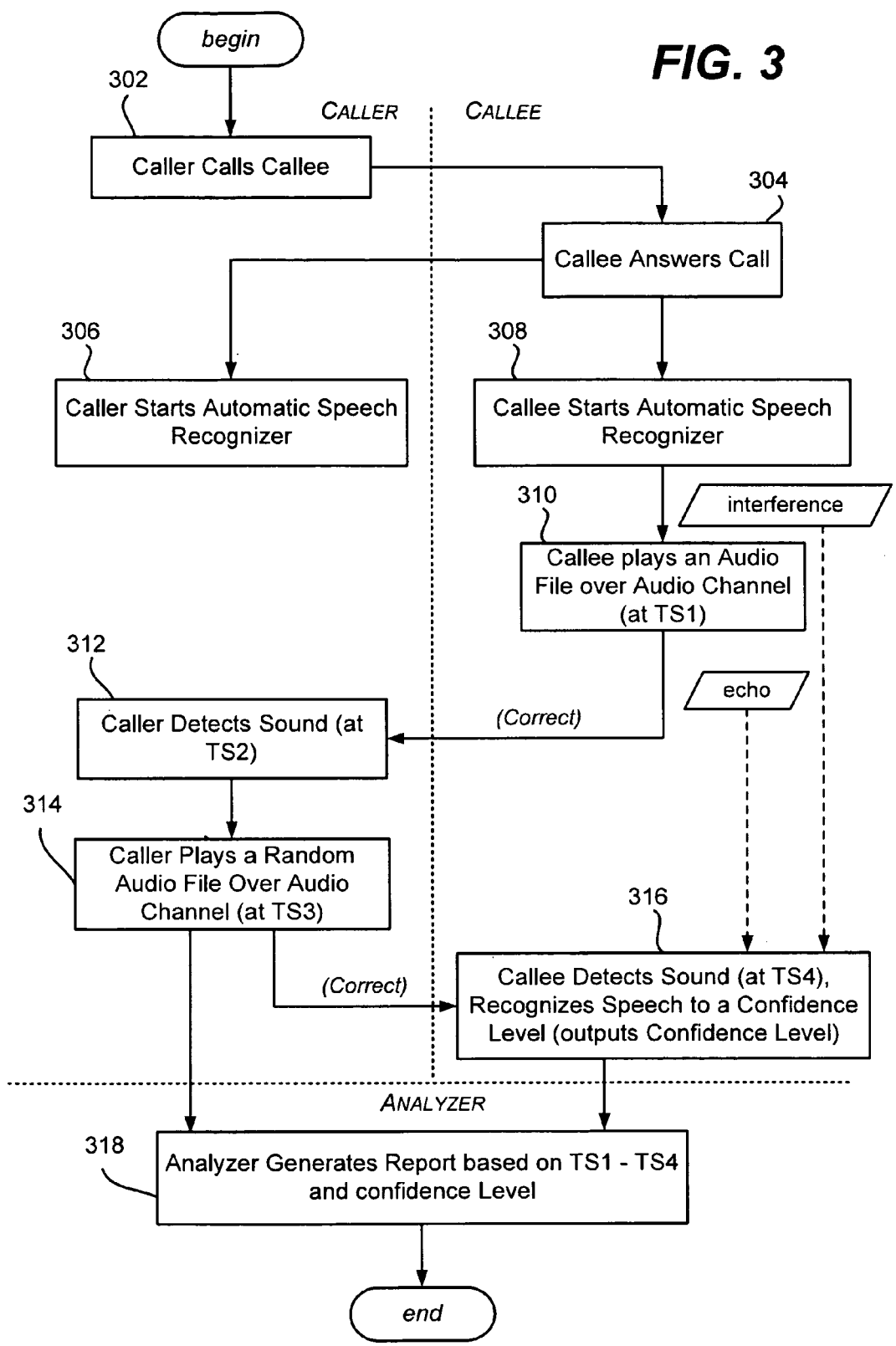
FIG. 3 is a flow diagram representing example steps taken by an analyzer in generating a report corresponding to a device under test.
Figure 4:
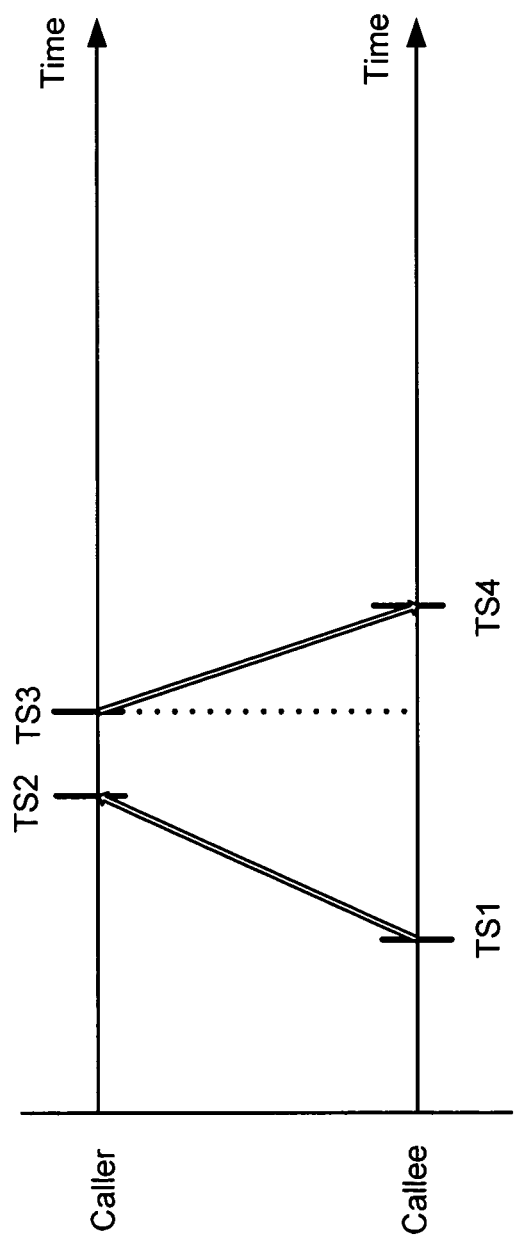
FIG. 4 is a timing diagram representing example time stamps triggered by caller and callee operations in a correctly executing device (gateway or IP-PBX) under test.

By way of example, one suitable test scenario comprises example steps as set forth in the flow diagram of FIG. 3, which performs actions at various times, as represented in the timing diagrams of FIGS. 4-7. In FIG. 3, the caller's actions are generally on the left side, and the caller's on the right (with the analyzer's step 318 at the bottom), with time progressing from top to bottom. Step 302 of FIG. 3 represents the caller calling the callee, with step 304 representing the callee answering the call. At steps 306 and 308, the caller and the callee start their automatic speech recognizers, respectively.

At step 310 the callee plays an audio file (e.g., a .wav file) over the audio channel established at steps 302 and 304. This step corresponds to timestamp 1 (TS1) in FIGS. 4-7, which is recorded at the callee and output (at sometime prior to analysis) to the analyzer.

At step 312, the caller's speech recognizer detects the speech (or other audio) from the callee's audio file. This detection corresponds to time TS2 in FIGS. 4-7 recorded at the caller and provided to the analyzer. Some later time, at TS3 in FIGS. 4-7 the caller then plays a randomly-selected audio file over the audio channel, (which needs to be a different audio file from the callee's audio file when echo detection based on speech recognition is used, as described below). The use of random selection over a variety of audio files (e.g., with different types of speech such as fast slow, deep voices and high voices) ensures that given enough test repetitions, the device under test will be evaluated over a variety of speech patterns. Note that rather than a random selection, a predefined pattern of audio files may be used, however random provides benefits because the timing of TS3 with respect to TS2 is also variable.

More particularly, TS3 is not always at the same interval following TS2, whether a random time interval is used or some preset time variation pattern. This ensures that, given enough repetitions, the timing of responding with the audio playback to the callee is not a factor in the test results. Random file selection in conjunction with random timing of playing back the file provides the least chance of a coincidence that would factor into the test results.

At step 316, the callee detects this speech, which in normal operation (FIG. 4) corresponds to timestamp TS4; Note however that as described below, the callee may instead already have generated TS4, because of echo from its own playback (FIG. 5) or interference detected (FIG. 6) at the callee.

Step 316 also represents the caller's speech being recognized at the callee, and an evaluation made as to the confidence level that the speech was recognized correctly. For example, the caller can notify the callee as to what audio file was selected, by which the callee can access known good recognition text to compare against the actually recognized text. In general, the confidence level is an indication of how accurately the callee's speech recognizer was able to recognize the speech.

It should be noted that although not explicitly shown in FIGS. 1-3, the exemplified test configurations and process may include a capability to measure the latency of a connection as well, to detect when the latency is too long to establish a call. For example, a timer is started at the caller mechanism at the onset of each test run, and the timer is stopped when the caller detects sound (corresponding to a timestamp TS2, described above). If however the timer expires/reaches a defined timeout period, this test session is flagged as having too long a latency to establish a call.

FIGS. 4-7 are example timing diagrams of possible conditions that provide test results. As set forth above, the timestamps TS1-TS4 comprise parameters that are measured while the test scenario executes, including TS1, the time when callee starts playing the callee's audio file; TS2, the time when the caller detects speech from that audio file; TS3 the time when the caller starts playing its (e.g., randomly-selected) audio file, and TS4, the time when the callee first detects sound (which may be speech). Note that a certain sound level may be tolerated before being considered detected sound, e.g., some threshold may be required to be exceeded by a sound before TS4 is considered as occurring so as to measured. Another parameter set comprises whether the callee recognized the speech and a corresponding confidence level.

With the parameters, the analyzer can use the causal ordering of these parameter events and/or the outcome of the speech recognizer to measure the quality of the audio channels, and hence the device under test. For example, in correct execution represented in FIG. 4, the callee detects speech after the caller starts playing the audio file (timestamp TS4 is greater than TS3); also, the callee recognizes the audio played by the caller. This is the expected outcome of the test, and occurs when the intermediary (e.g., the gateway under test) does not introduce echoes or noise interference. When the scenario executes successfully, the confidence level further provides an indication of the speech distortion (if any) introduced in the audio channel.

Figure 5:
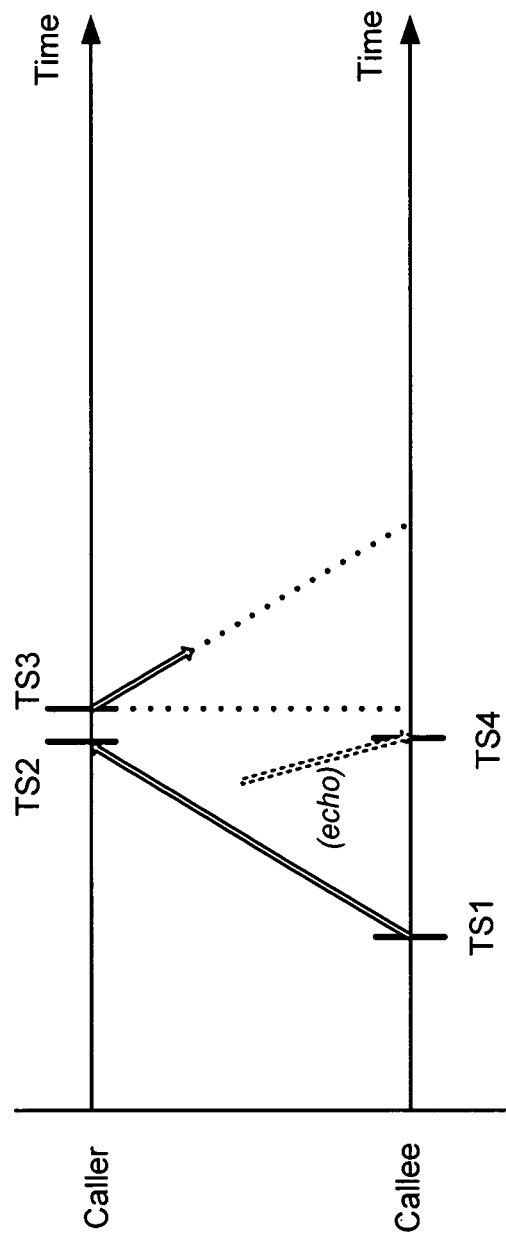
FIG. 5 is a timing diagram representing example time stamps triggered by caller and callee operations in a device under test that is generating echo.

FIG. 5 represents echo being detected on the callee's side. More particularly, in FIG. 5 the value for timestamp TS4 is less than the value of TS3, but greater than TS1. This implies that the callee detects speech even before the caller has started to speak at TS3, but some speech has begun at TS1. This typically is due to echo in the audio channel.

In addition to timestamp comparison, echo can also be detected by the speech recognizer. For example, if at TS4 the callee recognizer audio that it played at TS1, (and the audio files are different), this implies that callee is hearing itself rather than hearing the caller, which is also an echo. In this manner, the speech recognizer's outcome helps in detecting echoes, and more particularly in detecting delayed echoes that cannot be detected using the timestamp comparison.

Figure 6:
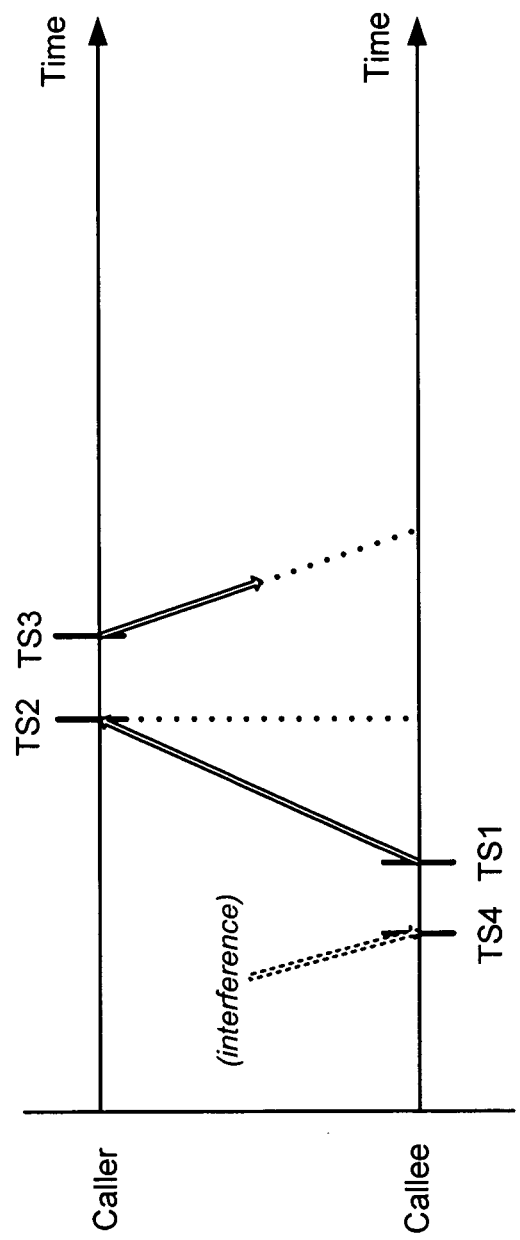
FIG. 6 is a timing diagram representing example time stamps triggered by caller and callee operations in a device under test that is generating interference detected by the callee.
Figure 7:
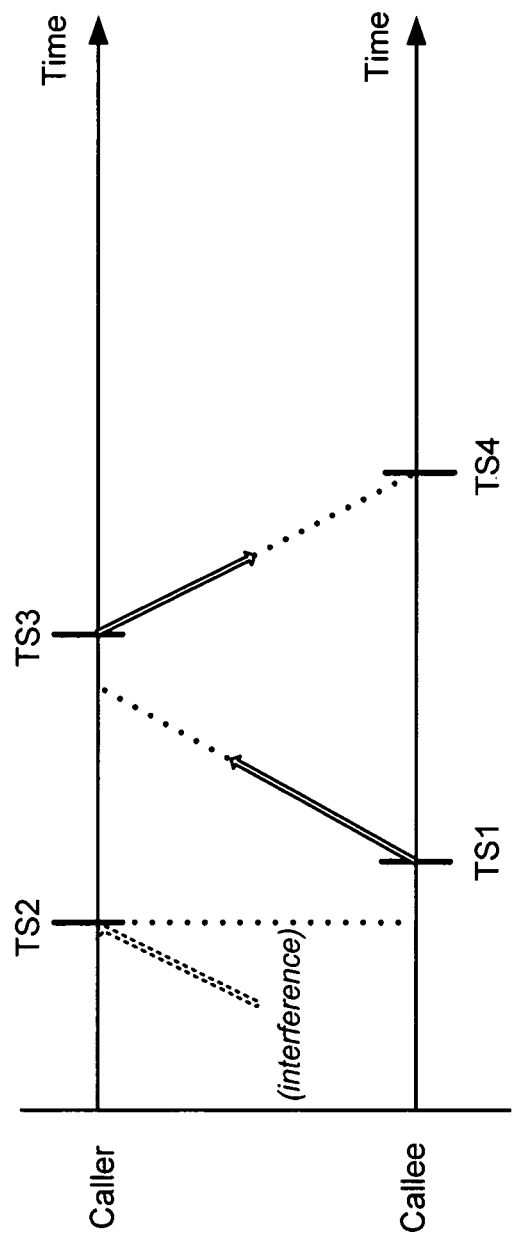
FIG. 7 is a timing diagram representing example time stamps triggered by caller and callee operations in a correctly executing device under test that is generating interference detected by the caller.

FIG. 6 represents interference being detected on the callee's side. In FIG. 6, the value of TS4 is less than that of TS1. This implies that the callee detects the speech even before any audio file has been played, which indicates noise interference in the audio channel. Similarly, as represented in FIG. 7, when the value of timestamp TS2 is less than that of TS1, this situation implies that caller detects the speech before any audio file has been played by the callee, thereby indicating noise interference in the audio channel.

In this manner, the test configurations (FIGS. 1 and 2) can quantitatively determine the quality of the audio channel in VoIP conversations by using automated speech recognition. The test configurations can detect echoes, random noise interferences and speech distortion introduced in the audio channel.

As can be readily appreciated, the above description is mainly for illustrative and example purposes. Those skilled in the art can easily generalize the invention to a large scale test operation, e.g., with multiple callers making calls to multiple callees, such as via multiple computing devices. Further, the various technological aspects and concepts described herein may be applied in an environment in which a mixture of PSTN, cellular and/or VoIP calls are simultaneously involved.

Exemplary Operating Environment

Figure 8:
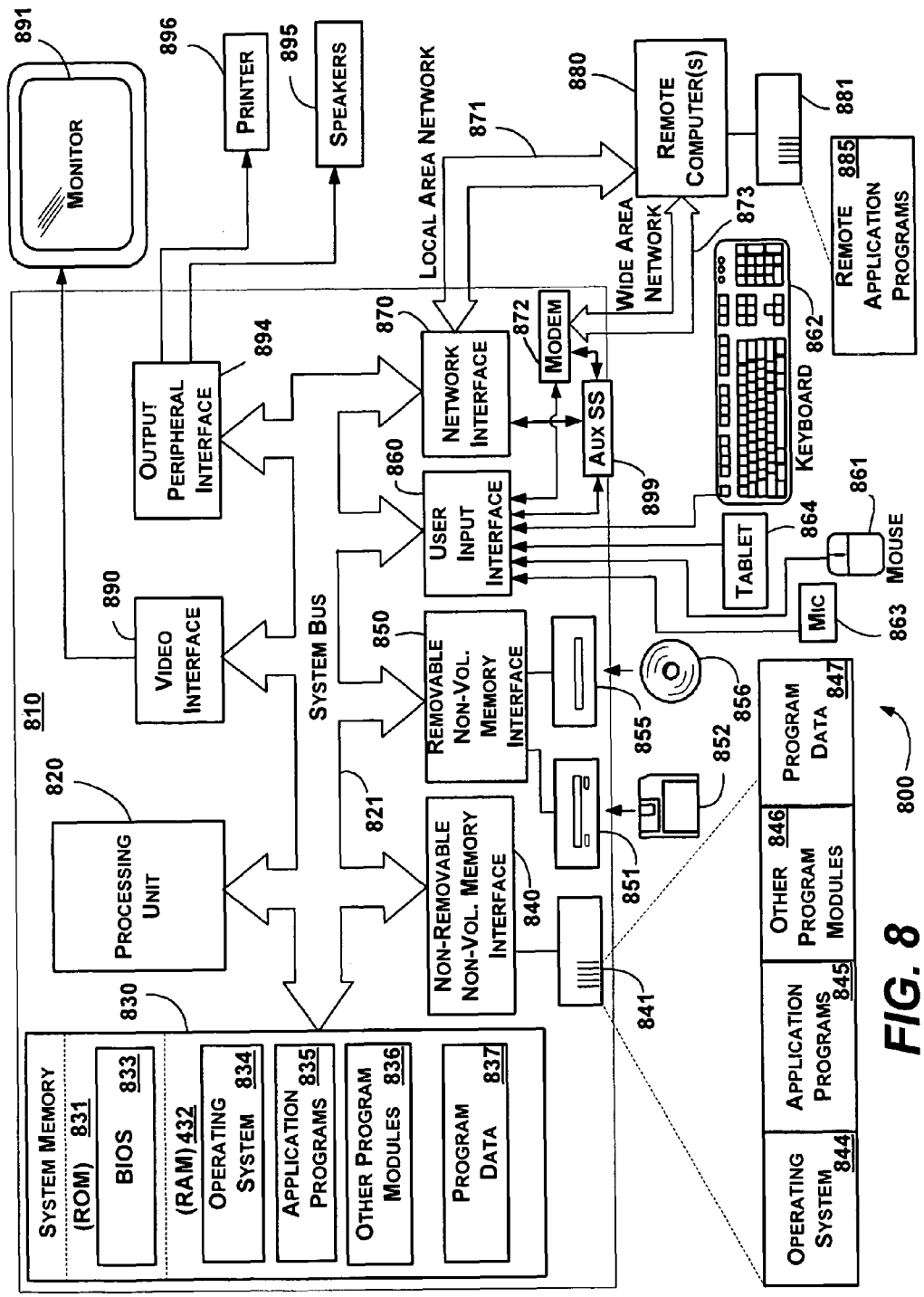
FIG. 8 shows an illustrative example of a general-purpose network computing environment into which various aspects of the present invention may be incorporated.

FIG. 8 illustrates an example of a suitable computing system environment 800 on which the computing device 102 of FIGS. 1 and 2 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   evaluating quality of an audio channel between a caller and a callee, including:
   outputting at the callee, at a first time represented by first time data, first audio generated from a first audio file;
   detecting the first audio at the caller at a second time represented by second time data, and in response, at a third time represented by third time data, outputting at the caller second audio generated from a second audio file; and
   detecting sound at the callee at a fourth time represented by fourth time data; and
   analyzing relative timing of members of a time set containing at least two of the first time data, second time data, third time data or fourth time data to provide results indicative of the quality of the audio channel.

2. The method of claim 1 wherein the audio channel includes an internet protocol-private branch exchange (IP-PBX) device, and further comprising, coupling a telephone device of the caller to a telephone device of the callee via the IP-PBX device.

3. The method of claim 1 wherein the audio channel includes a gateway, and further comprising, coupling a telephone device of the caller to a telephone device of the callee via the gateway.

4. The method of claim 1 further comprising, coupling a telephone device of the caller to a telephone device of the callee, and wherein outputting at the callee first audio comprises playing speech to a speech recognizer associated with the caller.

5. The method of claim 1 further comprising, coupling a telephone device of the caller to a telephone device of the callee, wherein outputting at the caller second audio comprises playing speech to a speech recognizer associated with the callee, and wherein evaluating the quality of the audio channel to provide results further comprises analyzing a confidence level corresponding to speech recognition accuracy at the callee.

6. The method of claim 5 further comprising, determining the confidence level at the callee based on actual recognition versus expected recognition.

7. The method of claim 1 wherein the time set contains at least two of the first, second, third and fourth times, and wherein analyzing the relative timing comprises determining that the first time is before the second time, the second time is before the third time, and the third time is before the fourth time, and wherein the results correspond to correct operation of the audio channel with respect to not having interference or echo.

8. The method of claim 1 wherein the time set contains at least two of the first, second, third and fourth times, and wherein analyzing the relative timing comprises determining that the fourth time is before the first time, or determining that the second time is before the first time, and wherein the results correspond to interference in the audio channel being detected at the callee.

9. The method of claim 1 wherein the time set contains at least two of the first, second, third and fourth times, and wherein analyzing the relative timing comprises determining that the fourth time is before the third time and after the first time, or the callee detects its own first audio, and wherein the results correspond to echo in the audio channel being detected at the callee.

10. The method of claim 1 further comprising, randomly selecting the second audio file.

11. The method of claim 1 wherein the time set contains at least two of the first, second, third and fourth times, and further comprising, randomly selecting a duration after the second time to establish the third time for outputting at the caller the second audio.

12. The method of claim 1 further comprising, receiving at analyzer logic first and fourth timestamps from the callee corresponding to the first time data and fourth time data, respectively, and receiving at the analyzer logic second and third timestamps from the caller corresponding to the second time data and third time data, respectively.

13. In a computing environment, a system comprising:
   a caller mechanism coupled for communication with a callee mechanism via an audio channel that includes a device under test;
   analyzer logic configured to receive timestamps from the caller mechanism and the callee mechanism during a calling session, including a first timestamp corresponding to when the callee mechanism initially provides audio to the caller mechanism, a second timestamp corresponding to when the caller mechanism initially detects sound, a third timestamp corresponding to when the caller mechanism initially provides audio to the callee mechanism, and a fourth timestamp corresponding to when the callee mechanism initially detects sound, and wherein the analyzer logic is configured to determine:
   1) the audio channel is operating correctly with respect to not having interference or echo when the first timestamp is before the second timestamp, the second timestamp is before the third timestamp, and the third timestamp is before the fourth timestamp;
   2) the audio channel has interference when the fourth timestamp is before the first timestamp, or when the second timestamp is before the first; or
   3) the audio channel has echo when the fourth timestamp is before the third timestamp and after the first timestamp, or the callee detects its own audio at the fourth timestamp that it initially provided at the first timestamp, and wherein the results correspond to echo being detected at the callee mechanism.

14. The system of claim 13 wherein the audio provided by the caller mechanism to the callee mechanism includes speech, wherein the callee mechanism is coupled to a speech recognizer that is configured to recognize the speech and further includes logic that is configured to determine a confidence level corresponding to accuracy of speech recognition, and wherein the analyzer logic is configured to generate a report based on the confidence level and whether the audio channel has interference or echo.

15. The system of claim 13 wherein the audio channel includes a voice over internet protocol (VoIP) gateway, a public switched telephone network (PSTN) gateway, or an internet protocol-private branch exchange (IP-PBX) device, or any combination of one or more VoIP gateways, PSTN gateways, or IP-PBX devices.

16. At least one computer storage medium having computer-executable instructions stored thereon which in response to execution by a computer, cause the computer to perform steps, comprising:

analyzing quality of an audio channel established between a caller and a callee that includes a device under test, including establishing a first timestamp corresponding to when the callee outputs first audio to the caller, establishing a second timestamp corresponding to when the caller detects the audio from the callee, establishing a third timestamp corresponding to when the caller outputs second audio including speech to the callee, establishing a fourth timestamp corresponding to when the callee detects sound, recognizing speech received at the callee and establishing a confidence level indicative of speech recognition accuracy, and using at least some of the timestamps to determine whether the audio channel has interference or echo; and outputting information corresponding to the analyzed quality including data indicative of whether the audio channel has interference or echo, or data indicative of the confidence level, or both data indicative of whether the audio channel has interference or echo and indicative of the confidence level.

17. The at least one computer storage medium of claim 16 wherein using at least some of the timestamps to determine whether the audio channel has interference or echo comprises determining that the audio channel has interference when the fourth timestamp is before the first timestamp or the second timestamp is before the first timestamp, or determining that the audio channel has echo when the fourth timestamp is before the third timestamp and after the first timestamp, or the speech recognizer on the callee mechanism detects its own audio at the third timestamp that it played at the first timestamp.

18. The at least one computer storage medium of claim 16 wherein establishing the confidence level comprises evaluating actual recognition versus expected recognition.

19. The at least one computer storage medium of claim 16 having further computer executable instructions stored thereon, which in response to execution by the computer, cause the computer to perform further steps comprising, randomly selecting a file for generating the second audio, or randomly selecting a duration to establish when the caller outputs the second audio, or both randomly selecting a file for generating the second audio and randomly selecting a duration to establish when the caller outputs the second audio.

* * * * *